Sept. 29, 1953   L. W. DYER ET AL   2,653,991
BUS DUCT FOR ELECTRICAL DISTRIBUTION SYSTEMS
Filed Jan. 19, 1949
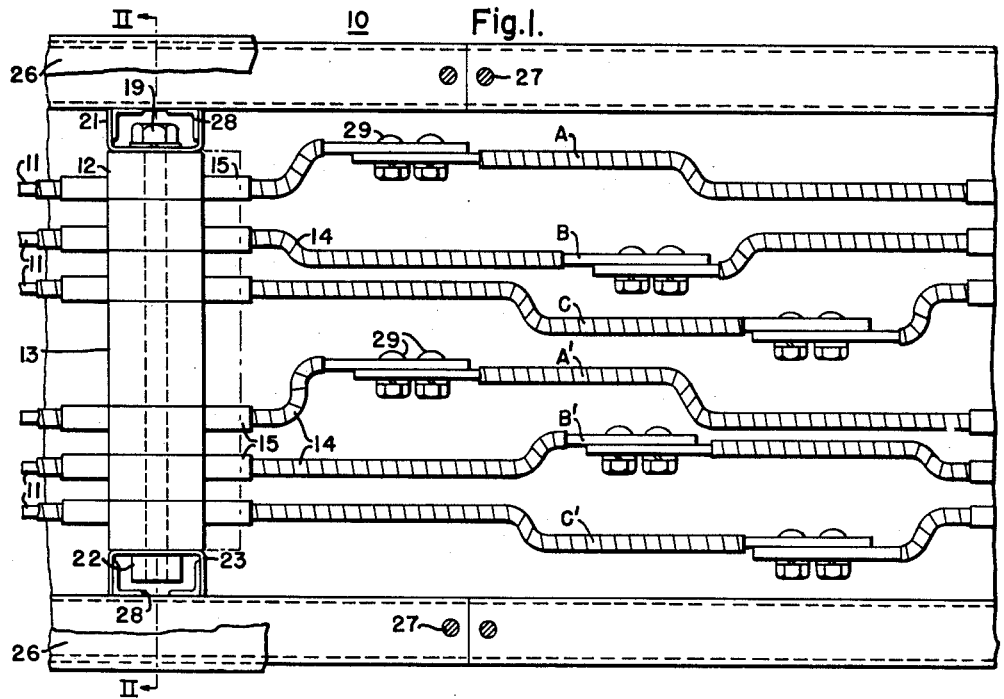
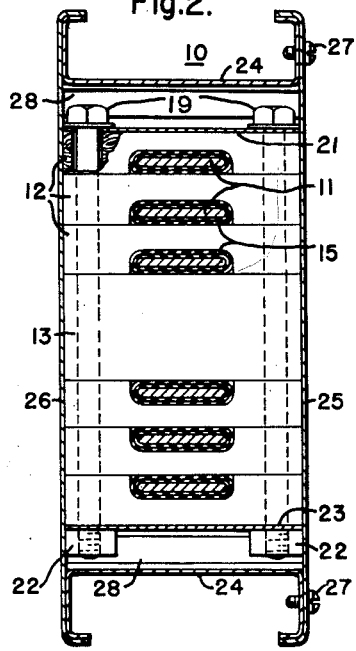
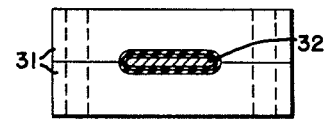
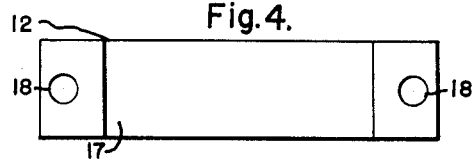
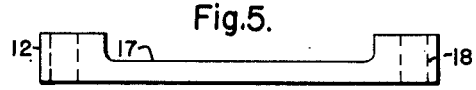
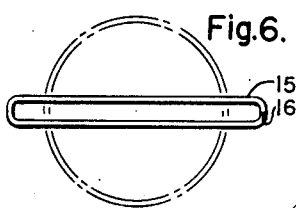
WITNESSES:
INVENTORS
Lloyd W. Dyer and
William F. Born.
BY
ATTORNEY Patented Sept. 29, 1953

2,653,991

UNITED STATES PATENT OFFICE 2,653,991

BUS DUCT FOR ELECTRICAL DISTRIBUTION SYSTEMS

Lloyd W. Dyer and William F. Born, Beaver, Pa., assignors to Westinghouse Electric Corporation, East Pittsburgh, Pa., a corporation of Pennsylvania Application January 19, 1949, Serial No. 71,584

5 Claims. (Cl. 174—99)

1

Our invention relates, generally, to bus ducts for electrical distribution systems and, more particularly, to a three-phase or three-phase four-wire bus duct assembly and construction, commonly known as feeder or low reactance bus duct.

It is known that the reactance of a multiphase power transmission system is reduced by spacing the phase conductors closely together. The close spacing neutralizes the magnetic fields and minimizes the skin and proximity effects normally caused when alternating current flows through the bus bars and, therefore, reduces the overall impedance to a minimum amount. If parallel-connected conductors are utilized for a phase conductor the inductive reactance of the system is reduced by so interlacing the phases that different phase conductors are adjacent.

An object of our invention is to provide a multi-phase bus duct in which conductors of different phases are spaced closely together.

Another object of our invention is to provide for rigidly supporting the power conductors inside of the housing of a multiphase bus duct.

A further object of our invention is to provide bus bar supports which may be completely assembled with the bus bars outside of the bus duct housing and then installed in the duct housing.

Still another object of our invention is to provide a bus duct structure which may be installed either horizontally or vertically.

A more general object of our invention is to provide a multiphase bus duct structure which shall be simple and efficient in operation and which may be economically manufactured and installed.

Other objects of our invention will be explained fully hereinafter or will be apparent to those skilled in the art.

In accordance with one embodiment of our invention, two sets of three-phase insulated bus bars are supported and separated by insulating blocks which are maintained under compression by tie bolts extending through the blocks from a channel at the top and tapping into pads welded to a similar channel at the bottom of the bus bars. The complete assembly of bus bars, insulation and supports can be assembled as one unit and dropped into place in the bus duct housing.

For a better understanding of the nature and objects of our invention, reference may be had to the following detailed description, taken in conjunction with the accompanying drawing, in which:

2

Figure 1 is a view, in side elevation, of a portion of a bus duct embodying the principal features of our invention, parts of the cover for the duct housing being removed;

Fig. 2 is a view, partially in end elevation and partially in section, along the line II—II in Fig. 1 of the bus duct;

Fig. 3 is a view, partially in end elevation and partially in section, showing a modified form of insulating blocks for supporting a bus bar;

Fig. 4 is an enlarged view, in plan, of one of the insulating blocks utilized in the structure shown in Figs. 1 and 2;

Fig. 5 is an enlarged view, in side elevation, of the block shown in Fig. 4, and Fig. 6 is an enlarged view, in end elevation, of an insulating sleeve for a bus bar.

Referring to the drawing, the bus duct structure shown therein comprises a housing 10 inside of which are disposed two sets of three-phase bus bars 11 which are supported by insulating blocks 12 and 13. The corresponding phases of the two sets of bus bars are designated A, B, C and A', B', C'. It will be understood that the conductors for each phase may be connected in parallel-circuit relation. The bus bars in each set are spaced relatively closely together, for example, on three-quarter inch centers. As explained hereinbefore, the close spacing reduces the overall impedance to a minimum amount.

Each bus bar 11 is taped throughout practically its entire length with an insulating tape 14 impregnated with a suitable varnish or similar material to increase the dielectric strength. At the points of support a short length of insulating tubing 15 is added on each bus bar underneath the supporting blocks to act as a spacer, additional insulator, and cushion for the bus bar to protect the tape against injury by the blocks because of expansion of the bar or by forces resulting from heavy short-circuit currents.

As shown in Fig. 6, the tube 15 may be formed from a cylindrical tube which is compressed to a substantially rectangular shape of the proper size to fit over the taped bus bar. The tube may be split at 16 to enable it to be opened sufficiently to be installed on the bus bar. The tape 14 and tubing 15 are preferably made of such material as to be good electrical insulation and also act as good heat conductors and heat dissipators.

As shown in Figs. 1 and 2, the insulated bus bars 11 are supported and separated by the blocks 12 and 13 which are preferably made from hard wood. As shown in Figs. 4 and 5, each block 12 is provided with a notch 17 for receiving the insulated bar 11. The notch 17 is so shaped that substantially the entire periphery of the sleeve 15 which is underneath adjoining blocks is engaged by the blocks. A hole 18 is provided at each end of each block 12. The block 13 is rectangular in shape and is provided with a hole at each end similar to the holes 18 in the blocks 12.

The blocks 12 and 13 are assembled on the bus bars in contiguous relation and maintained under compression against the sleeves 15 by tie bolts 19, disposed in the holes 18 at the front and the back of the supports. The bolts 19 extend through the supporting blocks from a channel 21 at the top and are threaded into pads or nuts 22 which may be welded to a channel 23 at the bottom of the blocks. In this manner the bus bars are firmly clamped between the blocks, and the clamping force is distributed over substantially the entire surface of each bar which is underneath a pair of supporting blocks.

The complete assembly of the bus bars, insulation and supports can be assembled as one unit outside of the housing and then dropped into place in the housing. It will be understood that a set of supporting blocks, channels and tie bolts may be provided at desired intervals along the bus duct structure, which is usually constructed in sections of a predetermined length, for example, ten feet with the supports located at two foot intervals or less if so desired.

As shown most clearly in Fig. 2, the housing 10 comprises formed channels 24, one at the top and one at the bottom of the housing, a front channel 25 and a back channel 26. The back channel 26 may be spot-welded to the top and bottom channels 24, while the front channel 25 may be secured in place with self-tapping screws 27. Thus, the front channel may be attached after the assembled bus bars and supports are inserted into the housing 10.

The front and the back channels may be made from either solid or perforated sheet steel. The perforated steel channels permit air to circulate around the bus bars, thereby reducing the temperature inside of the housing and permitting a current rating closely approximating the rating of the same bus bars when they are not installed inside a duct enclosure.

As shown most clearly in Fig. 1, spaced angle bars 28 may be welded to the top and the bottom channels 24 to locate the first and last bus bar supports of a ten foot section and to support the bus bar assembly. In this manner, longitudinal movement of the bus bars is prevented by the angles 28 which engage the channel members 21 and 23, and transverse movement of the bus bars is limited by the channels 21 and 23, the edges of which engage the top and the bottom channels 24 of the housing. Thus, the bus duct may be installed in either a horizontal or a vertical position and shifting of the conductors is restrained without piercing or damaging the bus bars or the insulation on the bus bars. When installed vertically, the weight of the bus bars is carried by the supporting blocks 12, the channels 21 and 23, the angles 28 and the housing 10.

As shown in Fig. 1, the joint between two sections of the bus duct may be made by connecting the overlapping ends of the bus bars with bolts 29. As shown, the ends of the bus bars for each phase are so staggered longitudinally and offset laterally that sufficient space is provided for making the bolted connections, and the bare ends of the bus bars are sufficiently separated to prevent arcing between phases. The wide spacing between the two sets of three-phase bars makes it possible to offset the bars laterally and still maintain the desired clearances.

When it is desired to utilize the bus duct in a three-phase four-wire system, two supporting blocks 31, such as shown in Fig. 3, and a full or half-sized insulated neutral bar 32 are substituted in place of the rectangular supporting block 13. In this manner, the same sized housing 10 may be utilized in either three-phase or three-phase four-wire distribution systems.

From the foregoing description, it is apparent that we have provided a bus duct structure which has a relatively low reactance and which is simple and rigid in construction. The bus bars and the supporting blocks may be readily assembled outside of the housing and then installed in place in the duct housing. The duct may be installed in either a vertical or a horizontal position and may be readily adapted to either a three-phase or a three-phase four-wire system.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a bus duct, in combination, a housing of generally rectangular cross section and having a cover at one side, at least two groups of substantially flat bus bars disposed in the housing with the plane of each of the bars perpendicular to the greatest cross-sectional dimension of the housing, each group containing three bus bars, said bus bars being so spaced that the distance between the bars of each group is less than the distance between groups, the distance between groups being sufficient for the installation of a neutral bar, each bar having a layer of insulation thereon over substantially its entire length, a plurality of supporting blocks for retaining the bus bars of each group in said closely spaced relation, an insulating sleeve surrounding part of the length of each bar and disposed between said insulation and said blocks, said blocks engaging substantially the entire periphery of said sleeve which is between the blocks, spacing means disposed between said groups of bus bars, tie bolts for clamping said blocks against the sleeves on the bus bars in an assembled group, said blocks being disposed in contiguous relation and having notches therein to receive the bus bars, and the assembled group of said bus bars, blocks, spacing means and tie bolts being insertable into said housing as a unit before said cover is installed.

2. In a bus duct, in combination, a housing of generally rectangular cross section and having a cover at one side, at least two groups of substantially flat bus bars disposed in the housing with the plane of each of the bars perpendicular to the greatest cross-sectional dimension of the housing, each group containing three bus bars, said bus bars being so spaced that the distance between the bars of each group is less than the distance between groups, each bar having a layer of insulation thereon over substantially its entire length, a plurality of supporting blocks for retaining the bus bars of each group in said closely spaced relation, an insulating sleeve surrounding part of the length of each bar and disposed between said insulation and said blocks, said blocks engaging substantially the entire periphery of said sleeve which is between the blocks, spacing means disposed between said groups of bus bars, tie bolts for retaining said blocks on said bus bars in an assembled group, said blocks being disposed in contiguous relation and having notches therein to receive the bus bars, channel members retained on said blocks by said tie bolts, the assembled group of bus bars, blocks, spacing means, tie bolts and channel members being insertable into said housing as a unit before said cover is installed, and guide members secured to said housing and cooperating with said channel members to retain the bus bars and supporting blocks in position in the housing.

3. In a bus duct, in combination, a housing of generally rectangular cross section and comprising at least two sections joinable together endwise, at least two sets of three-phase bus bars disposed in each section of the housing with the plane of each of the bars perpendicular to the greatest cross-sectional dimension of the housing, each set containing at least three substantially flat bus bars, corresponding phase bars of the sections having overlapping end portions connectable together to make joints in spaces between the sides of said bars, the width of each joint being substantially the same as the width of the bus bars, the overlapping portions of the outer bars of said sets being offset laterally away from and longitudinally of the overlapping portions of the center bars of said sets, the joints for the bars in one set being laterally opposite the joints for corresponding bars in the other set, the distance between two adjacent sets in each section being substantially greater than the combined lateral offsets of the two adjacent bars of said sets, a plurality of supporting blocks for retaining said bus bars in said offset relation, said blocks receiving the bars flatwise, and tie bolts for retaining said blocks on the bus bars in an assembled group.

4. In a bus duct, in combination, a housing of generally rectangular cross section and comprising at least two sections joinable together endwise, two groups of bus bars disposed in each section of the housing with the plane of each of the bars perpendicular to the greatest cross-sectional dimension of the housing, each group containing at least three substantially flat bus bars, corresponding bars of the sections having overlapping end portions connectable together to make joints in spaces between the sides of said bars, the width of each joint being substantially the same as the width of the bus bars, the overlapping portions of the outer bars of said groups being offset laterally away and longitudinally of the overlapping portions of the center bars of said groups, the joints for the bars in one group being laterally opposite the joints for corresponding bars in the other group, the distance between two adjacent groups in each section being substantially greater than the combined lateral offsets of the two adjacent bars of said groups, a plurality of blocks for supporting said bus bars, said blocks receiving the bars flatwise, clamping means for retaining said blocks on the bars in an assembled group, and said housing having a width and depth at the joints substantially the same as the portions intermediate the joints.

5. In a bus duct, in combination, a housing of generally rectangular cross section and comprising at least two sections joinable together endwise, at least two sets of three-phase bus bars disposed in each section of the housing with the plane of each of the bars perpendicular to the greatest cross-sectional dimension of the housing, each set containing at least three substantially flat bus bars, corresponding phase bars of the sections having overlapping end portions connectable together to make joints in spaces between the sides of said bars, the width of each joint being substantially the same as the width of the bus bars, the overlapping portions of the outer bars of said sets being offset laterally away from and longitudinally of the overlapping portions of the center bars of said sets, the joints for the bars in one set being laterally opposite the joints for corresponding bars in the other set, the distance between two adjacent sets in each section being substantially greater than the combined lateral offsets of the two adjacent bars of said sets, said housing having a width and depth at the joints substantially the same as the portions intermediate the joints, a plurality of supporting blocks for retaining said bus bars in said offset relation, said blocks being notched to receive the bars flatwise, tie bolts for retaining said blocks on the bus bars in an assembled group for each housing section, guide members retained on the blocks by the tie bolts, and guide members secured to the housing and cooperating with the guide members on the blocks to retain the bus bars in position in the housing.

LLOYD W. DYER.
WILLIAM F. BORN.

References Cited in the file of this patent

UNITED STATES PATENTS

| Number | Name | Date |
| --- | --- | --- |
| 2,181,664 | Melzer | Nov. 28, 1939 |
| 2,275,203 | Rudd | Mar. 3, 1942 |
| 2,320,093 | Moore | May 25, 1943 |
| 2,343,216 | Frank | Feb. 29, 1944 |
| 2,439,956 | Wagner | Apr. 20, 1948 |
| 2,468,614 | Carlson | Apr. 26, 1949 |